United States Patent
Inoue

(10) Patent No.: US 10,326,897 B2
(45) Date of Patent: Jun. 18, 2019

(54) IMAGE FORMING APPARATUS WHICH UTILIZES A WEB BROWSER TO DISPLAY A FIRST OR PREVIOUS SCREEN

(71) Applicant: Hiroyuki Inoue, Kanagawa (JP)

(72) Inventor: Hiroyuki Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/907,671

(22) Filed: Feb. 28, 2018

(65) Prior Publication Data

US 2018/0278767 A1  Sep. 27, 2018

(30) Foreign Application Priority Data

Mar. 22, 2017 (JP) ................. 2017-055852

(51) Int. Cl.
  *H04N 1/00*  (2006.01)
  *H04L 29/08*  (2006.01)

(52) U.S. Cl.
  CPC ..... *H04N 1/00464* (2013.01); *H04N 1/00474* (2013.01); *H04N 1/00503* (2013.01); *H04L 67/02* (2013.01); *H04N 2201/0094* (2013.01)

(58) Field of Classification Search
  USPC ........................................ 358/1.14
  See application file for complete search history.

(56) References Cited

U.S. PATENT DOCUMENTS

| 2015/0002888 A1* | 1/2015 | Tsujimoto ............ G03G 15/502 358/1.14 |
| 2015/0262544 A1 | 9/2015 | Asakimori et al. |
| 2017/0270290 A1 | 9/2017 | Inoue |

FOREIGN PATENT DOCUMENTS

| JP | 2002-36638 A | 2/2002 |
| JP | 2002-56028 A | 2/2002 |
| JP | 2016-148944 A | 8/2016 |

* cited by examiner

*Primary Examiner* — Neil R McLean
*Assistant Examiner* — Darryl V Dottin
(74) *Attorney, Agent, or Firm* — Oblon, McClelland, Maier & Neustadt, L.L.P.

(57) ABSTRACT

An operation panel, circuitry; and a web browser executing on the circuitry. The circuitry performs receiving an instruction to execute a web application, determining whether the web application was previously executed, displaying a previously generated screen of the web application, when the determining determines that the web application was previously executed, and displaying a new screen of the web application corresponding to a start screen, when the determining determines that the web application was not previously executed.

10 Claims, 13 Drawing Sheets

| FIG. 13A |
| FIG. 13B |

IMAGE FORMING APPARATUS WHICH UTILIZES A WEB BROWSER TO DISPLAY A FIRST OR PREVIOUS SCREEN

CROSS-REFERENCE TO RELATED APPLICATIONS

The present application is based upon and claims the benefit of priority of Japanese Patent Application No. 2017-055852, filed on Mar. 22, 2017, the contents of which are incorporated herein by reference in their entirety.

BACKGROUND OF THE INVENTION

1. Field of the Invention

The present invention relates to an image forming apparatus, an information processing method, and an information processing apparatus.

2. Description of the Related Art

In recent years, various types of apparatuses including an image forming apparatus have a web browser. Such apparatuses are able to execute a web application in addition to a native application which is an application program stored in and executed in the apparatus. The Web application is an application program (hereinafter said as "an application") loaded in the Web browser and executed by or using the Web browser. The apparatus displays a screen (hereinafter referred to as "a home screen") on which a plurality of icons corresponding to applications are displayed to accept a user selection of one of the application to be activated.

Japanese Laid-Open Patent Publication No. 2002-56028 discloses that, on the home screen, icons of each application are arranged without any differences between the native application and the web application. Therefore, the user can use each application without being conscious of the difference in the contents or manner of execution of each application.

SUMMARY OF INVENTION

The present inventors have recognized that there exists an inconsistency between the Web application and the native application regarding holding screens and transitioning between applications.

Specifically, suppose a user selects an icon of a native application A, and the user operates the first screen to move from the home screen to the next or second screen in the application A. In this case, when the icon of the native application A is selected again on the home screen, even after the user operates another application B, the second screen of the native application A is displayed. This is because, when another application B is operated as an operation target, the native application A is only hidden (as an under layer). If the icon of the native application A is selected again, the native application A is not re-started, but only shifted from the non-display state to the display state.

On the other hand, in case of the Web application, when an icon of the Web application is selected, the Web browser loads the Web application every time based on the URL (Uniform Resource Locator) associated with the icon. Therefore, if the user selects the link on the first screen (page) in the Web application, and transitions from the first screen to the next or second screen, after the user uses another application and subsequently select on the home screen the icon of the Web application again, the first screen of the Web application is displayed, not the next second screen of the Web application.

Additionally, the inventors have recognized that the Web browser is used by a plurality of Web applications. Therefore, when the user selects the icon of the Web application selected first and initiates the Web browser, it is not adequate to merely change the Web browser from the non-display state to the display state. The inventors have recognized that the Web browser does not display the correct Web application corresponding to the selected icon. In the case that the Web browser last displayed and executed the Web application X, if the user select the icon of the Web application Y after using another native application, the Web browser is shifted to the display state from the non-display state, and therefore the screen of the Web application X is displayed on the web browser before Web application Y can load.

According to one aspect of the invention, there is an operation panel, circuitry; and a web browser executing on the circuitry. The circuitry performs receiving an instruction to execute a web application, determining whether the web application was previously executed, displaying a previously generated screen of the web application, when the determining determines that the web application was previously executed, and displaying a new screen of the web application corresponding to a start screen, when the determining determines that the web application was not previously executed.

According to another aspect of the invention, there is an image processing method performed using an operation panel, circuitry, and a web browser executing on the circuitry. The method includes receiving an instruction to execute a web application and determining whether the web application was previously executed. The method further displays a previously generated screen of the web application, when the determining determines that the web application was previously executed. Alternatively, the method displays a new screen of the web application corresponding to a start screen, when the determining determines that the web application was not previously executed.

DETAILED DESCRIPTION OF THE PREFERRED EMBODIMENTS

Figure 1:
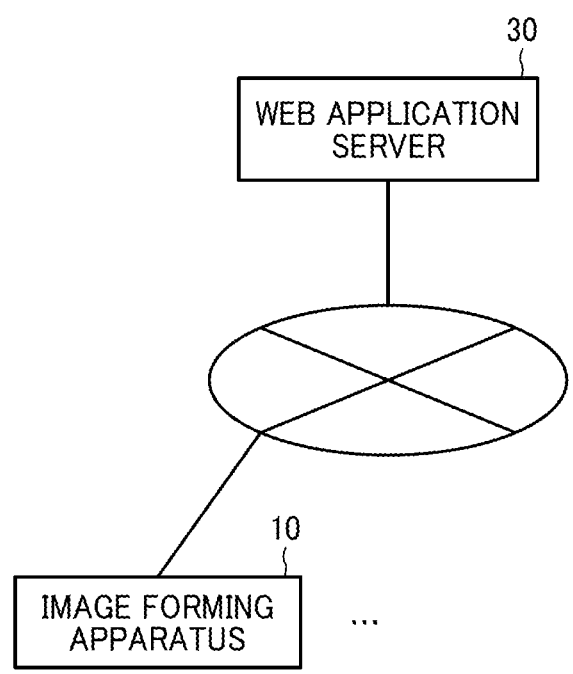
FIG. 1 is a diagram showing a configuration of an information processing system according to a first embodiment.

An embodiment of the present invention is described below with reference to the drawings in which like reference numbers designate the same or corresponding parts. FIG. 1 is a diagram showing a system configuration according to the first embodiment. In FIG. 1, an image forming apparatus 10 is connected respectively to the Web application server 30 via a LAN (Local Area Network) or a network such as the Internet. There may be one or more of the image forming apparatus 10.

The image forming apparatus 10 is a multifunction peripheral which has two or more functions such as printing, scanning, copying, facsimile transmission and the like in a single casing or unit. However, only one of these functions or other function(s) may be used in the image forming apparatus 10.

The web application server 30 includes one or more computers that store a web application executed in the image forming apparatus 10. The Web application is, for example, an application program that includes HTML (Hypertext Markup Language), CSS (Cascading Style Sheets), JavaScript and/or the like. The Web application is executed on a Web browser included in the image forming apparatus. Each image forming apparatus 10 may be connectable to a plurality of web application servers 30.

Figure 2:
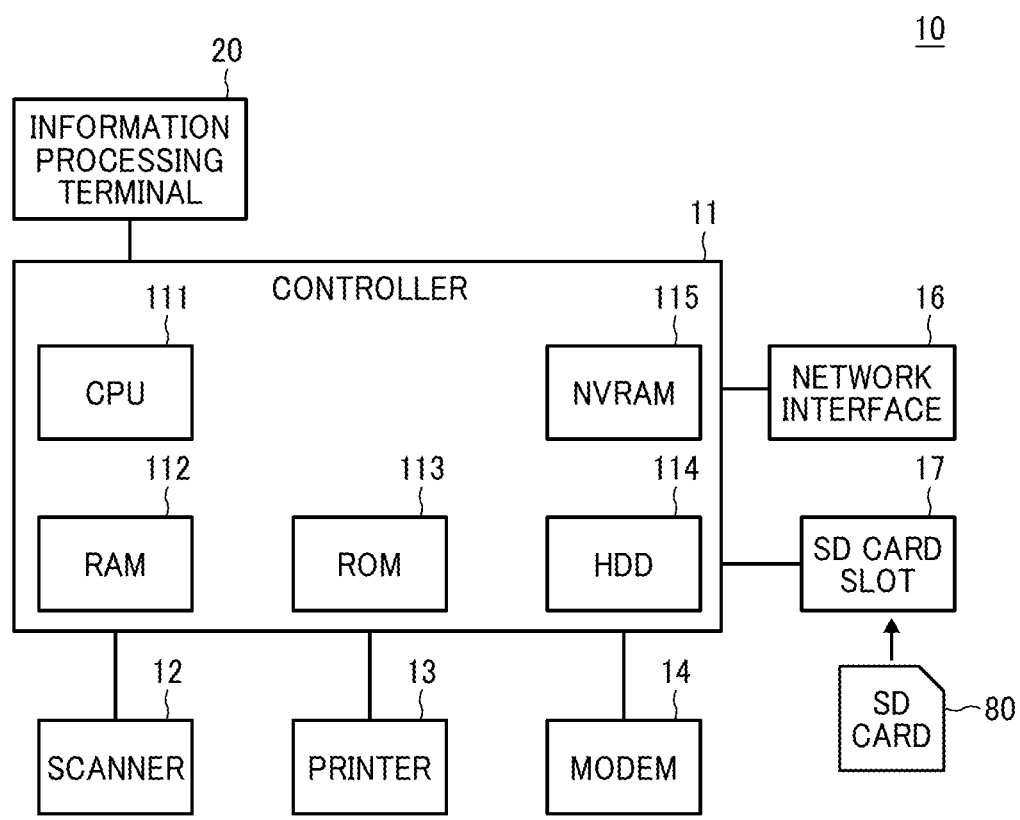
FIG. 2 is a diagram showing a hardware configuration of an image forming apparatus according to a first embodiment.

FIG. 2 is a diagram showing a hardware configuration of the image forming apparatus 10 in the first embodiment. In FIG. 2, the image forming apparatus 10 has a controller 11, a scanner 12, a printer 13, a modem 14, a network interface 16, and an SD card slot 17 and the like.

The controller 11 is a computer in the main body of the image forming apparatus 10. In FIG. 2, the controller 11 includes a CPU 111, a RAM 112, a ROM 113, an HDD 114, an NVRAM 115, and the like. The ROM 113 stores various programs and data used by the various programs and the like. The ROM 113 may be implemented using a rewritable memory, such as flash memory. The RAM 112 is used as a storage area for loading a program, and a work area of a loaded program, and the like. The CPU 111 implements various functions by processing the program loaded in the RAM 112, for example printing or scanning process. The HOD 114 stores programs and various kinds of data used by programs. NVRAM 115 stores various setting information and the like.

The scanner 12 is hardware (image reading means) for reading image data from a document. The printer 13 is hardware (printing means) for printing print data on paper. The modem 14 is hardware for connecting to a telephone line, and is used for transmission and reception of image data by facsimile or telephone communication. The network interface 16 is hardware for connecting to a network such as a LAN (wired or wireless). The SD card slot 17 is used for reading the program stored in the SD card 80. The image forming apparatus 10 can load not only the program stored in the ROM 113 but also the program stored in the SD card 80, into the RAM 112 and execute. Another recording medium (for example, a CD-ROM or USB (Universal Serial Bus) memory or the like) may be used instead of The SD card 80. In other words, the type of the recording medium is not limited to one type like the SD card 80. In this case, the SD card slot 17 may be replaced by hardware corresponding to the type of the recording medium.

The information processing terminal 20 is also connected to the controller 11. The information processing terminal 20 is, for example, a device such as a smart phone or a tablet terminal, or a touch screen user interface. An example of a smart phone is a terminal having multiple functions including a call function as a mobile phone, an imaging function by a camera, and a Web information display function like a PC. As an example of the tablet terminal, a tablet type terminal functioning as a multifunction terminal like a smartphone can be utilized.

In the present embodiment, the information processing terminal 20 may be operable as an operation unit of the image forming apparatus 10. More specifically, the information processing terminal 20 may be connected to the controller 11 in place of an operation panel conventionally installed as an operation unit dedicated to the image forming apparatus 10. The controller 11 and the information processing terminal 20 are connected via, for example, a USB cable, short distance wireless communication, a communication line such as a LAN, or through any desired communication medium.

Figure 3:
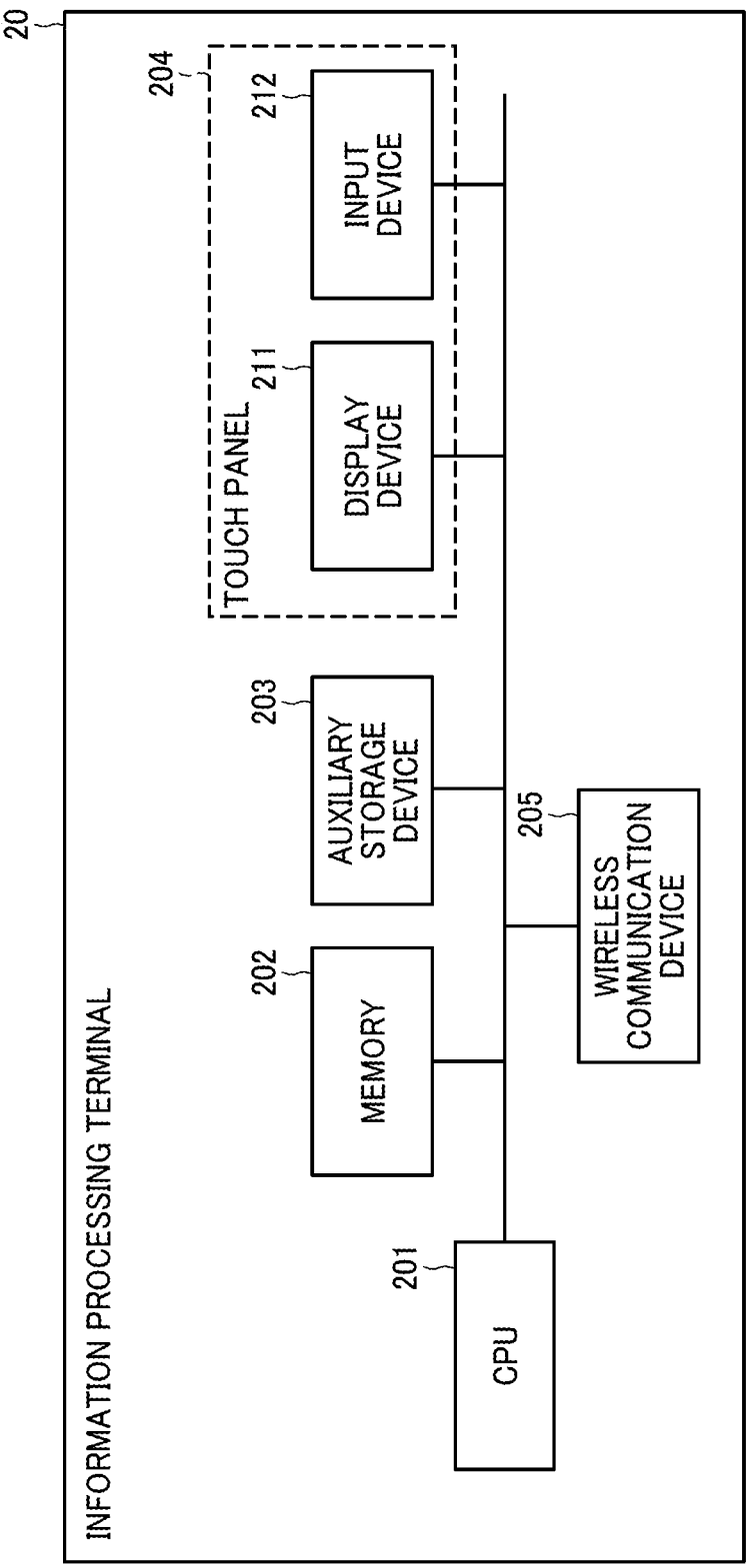
FIG. 3 is a diagram showing a hardware configuration of an information processing terminal according to the first embodiment.

FIG. 3 is a diagram showing an example of hardware configuration of the information processing terminal 20 in the first embodiment. In FIG. 3, the information processing terminal 20 includes a CPU 201, a memory 202, an auxiliary storage device 203, a touch panel 204, a wireless communication device 205, and the like.

The auxiliary storage device 203 stores programs and the like installed in the information processing terminal 20. The memory 202 reads out a program from the auxiliary storage device 203 and stores it when the CPU 201 is received an instruction to initiate the program. The CPU 201 implements the function of the information processing terminal 20 according to the program stored in the memory 202. The CPU 201 is independent from the CPU 111 in the controller 11 and is operable by itself.

The touch panel 204 is an electronic component having both an input function and a display function. Also, the touch panel 204 displays information, accepts input from a user, and the like. The touch panel 204 includes a display device 211, an input device 212, and the like.

The display device 211 is a liquid crystal display or the like, and is in charge of the display function of the touch panel 204. The input device 212 is an electronic component including a sensor that detects contact of an object with the display device 211. The detecting method of the contact with the display device 211 may be any of known methods, such as an electrostatic method, a resistive film method, an optical method, or the like. The contact object is in contact with the contact surface of the touch panel 204. An example of such an object is a finger of a user, a dedicated or a general pen, or the like.

The wireless communication device 205 is an electronic component that is an antenna required for communication in wireless LAN (Local Area Network) or a mobile communication network, and the like. However, the wireless communication device 205 is optional.

Figure 4:
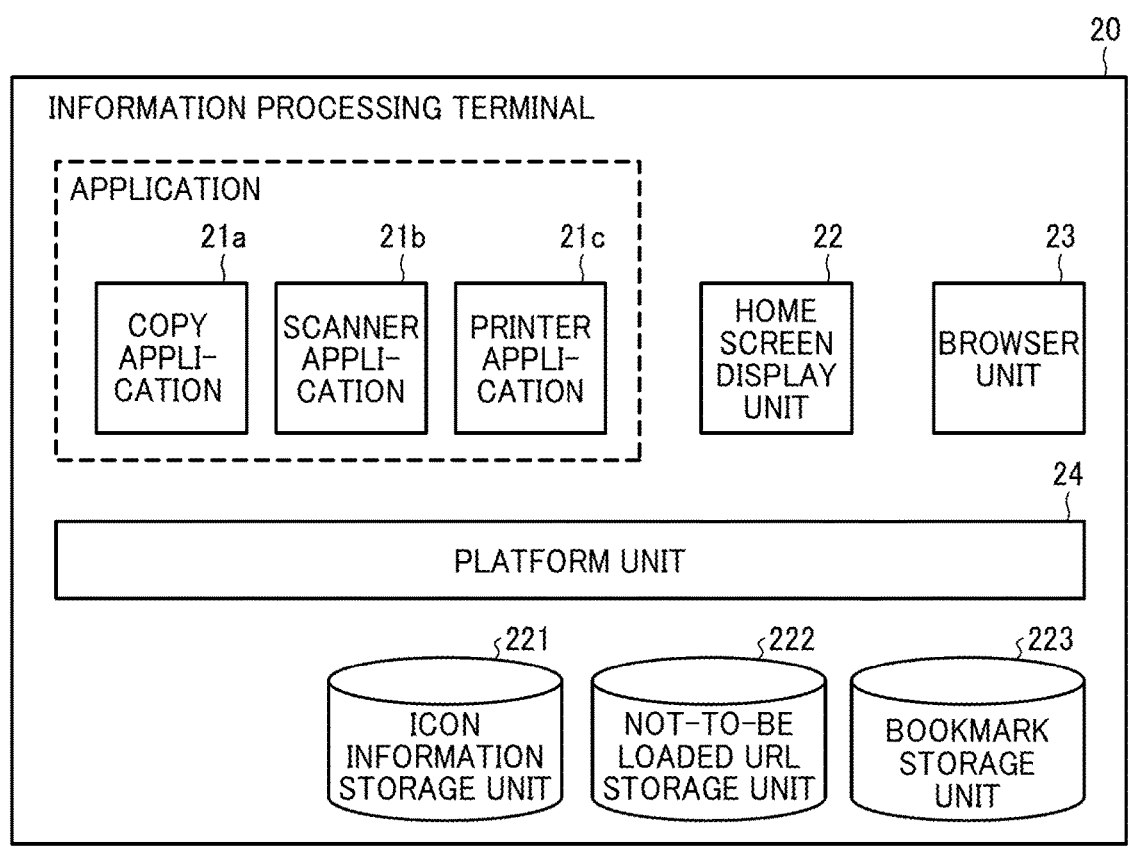
FIG. 4 is a diagram showing a functional (software) configuration of an information processing terminal according to the first embodiment.

FIG. 4 is a diagram showing an example function (software) configuration of the information processing terminal 20 in the first embodiment. In FIG. 4, the information processing terminal 20 includes various applications including a copy application 21a, a scanner application 21b, a printer application 21c and the like. The information processing terminal 20 also includes a home screen (an initial screen or a base screen) display unit 22, a browser unit 23, a platform unit 24 and the like. Each of these units are implemented by processes embodied in one or more programs installed in the information processing terminal 20 executed by the CPU 201. The information processing terminal 20 also includes or uses the icon information storage unit 221, the not-to-be loaded URL storage unit 222, the bookmark storage unit 223, and the like. Each of these storage units can be implemented by controlling the storage of information in, for example, the auxiliary storage device 203 or a storage device or the like, connectable to the information processing terminal 20 via a network or communication line or bus. For example, the HDD 114 or the NVRAM 115 included in the image forming apparatus 10 may be used as each of these storage units.

The copy application 21a, the scanner application 21b, and the printer application 21c are examples of native applications. The copy application 21a is an application that cause the image forming apparatus 10 to execute a copy in response to a user's operation. The scanner application 21b is an application that cause the image forming apparatus 10 to execute a scan in response to a user's operation. The printer application 21c is an application that causes the image forming apparatus 10 to execute printing in response to a user's operation or reception of print data.

The home screen display unit 22 is an application that displays on the display device 211 a screen (hereinafter said as "home screen") on which icons of each application and each web application are arranged. Information concerning icons of each application and each Web application to be displayed on the home screen is stored in the icon information storage unit 221.

The browser unit 23 is a Web browser that provides an environment to execute the Web application. The browser unit 23 acquires and loads the web application (web content) including HTML, JavaScript, CSS, and displays the screen of the web application on the operation panel of the image forming apparatus. A general Web browser may be used as the browser unit 23. In the present embodiment, the browser unit 23 is functionally extended so as to be able to interpret a script (hereinafter referred to as "an extended script") extended to control the image forming apparatus 10. Furthermore, when the icon of the Web application lastly used is selected again, the browser unit 23 is configured to display the Web application in the operation state of the last operation of the Web application.

The platform unit 24 is operable as an application platform for each application, the home screen display unit 22, and the browser unit 23. For example, the platform unit 24 controls the initiation of each application, the home screen display unit 22, and the browser unit 23, and also provides an API (Application Program Interface) for controlling the image forming apparatus 10 to each application and the browser unit 23 and the like. The API is provided to receive the instruction to control the image forming function using the printer or scanner or fax, network function, or authentication function, and the like included in the image forming apparatus. The API may be included in the controller 11. Each application can cause the image forming apparatus 10 to execute copying, scanning, printing, or the like, by calling the API. Furthermore, the browser unit 23 can cause the image forming apparatus 10 to execute processing, including image processing and the like, corresponding to the extended script by calling the API.

The not-to-be loaded URL storage unit 222 is a program actuated by the CPU 201, and stores URLs (Uniform Resource Locators) that the browser unit 23 does not set as a load target, in the memory (for example memory 202) of the information processing terminal 20. Alternatively, the not-to-be loaded URL storage unit 222 is a memory location.

The bookmark storage unit 223 is program actuated by the CPU 201, and stores Information relating to the bookmarks of the Web applications (hereinafter said as "bookmark information"), in the memory of the image forming apparatus (for example the auxiliary storage device 203 or the HDD 114). The bookmark may include the URLs of the Web applications for which icons are not displayed on the home screen. Alternatively, the bookmark storage unit is a memory location.

Figure 5:
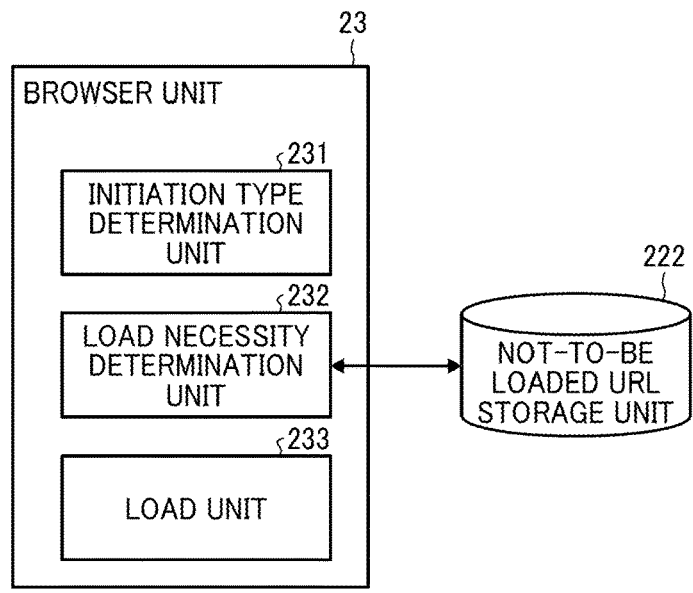
FIG. 5 is a diagram showing a functional (software) configuration of a browser unit in the first embodiment.

FIG. 5 is a diagram showing a functional (software) configuration of the browser unit 23 in the first embodiment. In FIG. 5, the browser unit 23 includes an initiation (start or boot) type determination unit 231, a load necessity determination unit 232, a load unit 233, and the like. These units are software modules or functionality included in the browser unit 23 (web browser) executed by the CPU 201. The initiation type determination unit 231 determines the type of the occurrence reason (hereinafter said as "initiation type") of the initiation instruction, according to reception of an instruction to initiate the Web application. In the present embodiment, the Web application is initiated by a selection of an icon (URL link or shortcut) on the home screen, a request from another application, a direct input of a URL to the web browser, a selection of a bookmark on the web browser, or the like. The initiation type determination unit 231 determines the initiation type among these occurrence reasons (said selection, request, input, and the like).

The load necessity determination unit 232 determines whether loading of the Web application is necessary, based on the determination result by the initiation type determination unit 231 and whether or not the Web application received the initiation instruction because the Web application was loaded in the last time (initiated on the web browser in a previous time). When determining that loading of the web application is necessary, the load necessity determining unit 232 stores the URL corresponding to the web application in the not-to-be loaded URL storage unit 222. In other words, the URL of the web application loaded last is stored in the not-to-be loaded URL storage unit 222. Therefore, the load necessity determining unit 232 can determine whether or not the Web application instructed to be executed is the last loaded Web application, by referring to the not-to-be loaded URL storage unit 222 and compare the not-to-be loaded URL and the URL which has been selected. "Loading" means acquiring a web application from the web application server 30, and deploying in the memory in the information processing terminal 20.

The loading unit 233 acquires the Web application from the Web application server 30 based on the URL corresponding to the Web application in response to the initiation instruction and displays a screen interpreted based on the definition of the Web application on the display device 211. The loading unit 233 includes a rendering engine. For example, "Web View" in an Android (registered trademark) system may be used as the loading unit 233.

Figure 6:
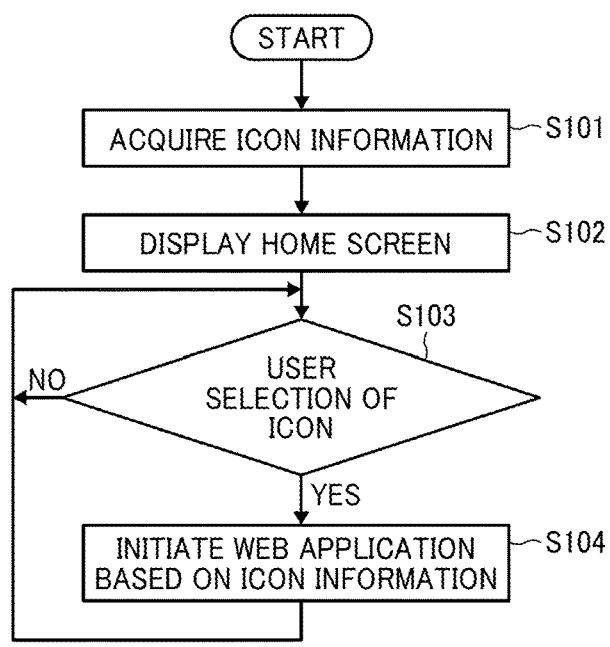
FIG. 6 is a flowchart for explaining an example of a processing procedure executed by the home screen display unit in the first embodiment.

The processing procedure executed by the information processing terminal 20 is described below. FIG. 6 is a flowchart for explaining a processing procedure executed by the home screen display unit 22 in the first embodiment.

The home screen display unit 22 is initiated by the platform unit 24, for example, when the information processing terminal 20 is started up when or after booting of the image forming apparatus 10, and executes the processing procedure shown in FIG. 6.

In step S101, the home screen display unit 22 acquires icon information of each native application and each Web application from the icon information storage unit 221. The icon information includes, for example, identification information of an icon image to be used as an icon, a command executed when a user selects an icon, parameters given to the command, and the like. The command is an initiation command to initiate the application corresponding to the icon. About the Web application, a character string indicating a start instruction of the Web application is stored as the command. An URL (Uniform Resource Locator) as identification information of the Web application, and an initiation type (information indicating initiation reason) for starting up the Web application are included in the icon information as parameters. The initiation type includes information indicating how the initiation instruction of the Web application has occurred. Values of the parameter includes "shortcut", "other application", and the like. "Shortcut" indicates the generation of an initiation instruction by selecting an icon (shortcut icon) on the home screen. "Another application" indicates the generation of an initiation instruction based on a request from another application. In other words, the initiation instruction of the Web application can be input to the browser unit 23 from another applications linked with the Web application. For example, another application (including native application and web application) has a screen including an URL, and when the URL is selected by user, the browser unit 23 is initiated to display the screen of a web application indicated by the URL.

Subsequently, the home screen display unit 22 displays the home screen on the display device 211 based on the icon information acquired by the home screen display unit 22 (S102).

Figure 7:
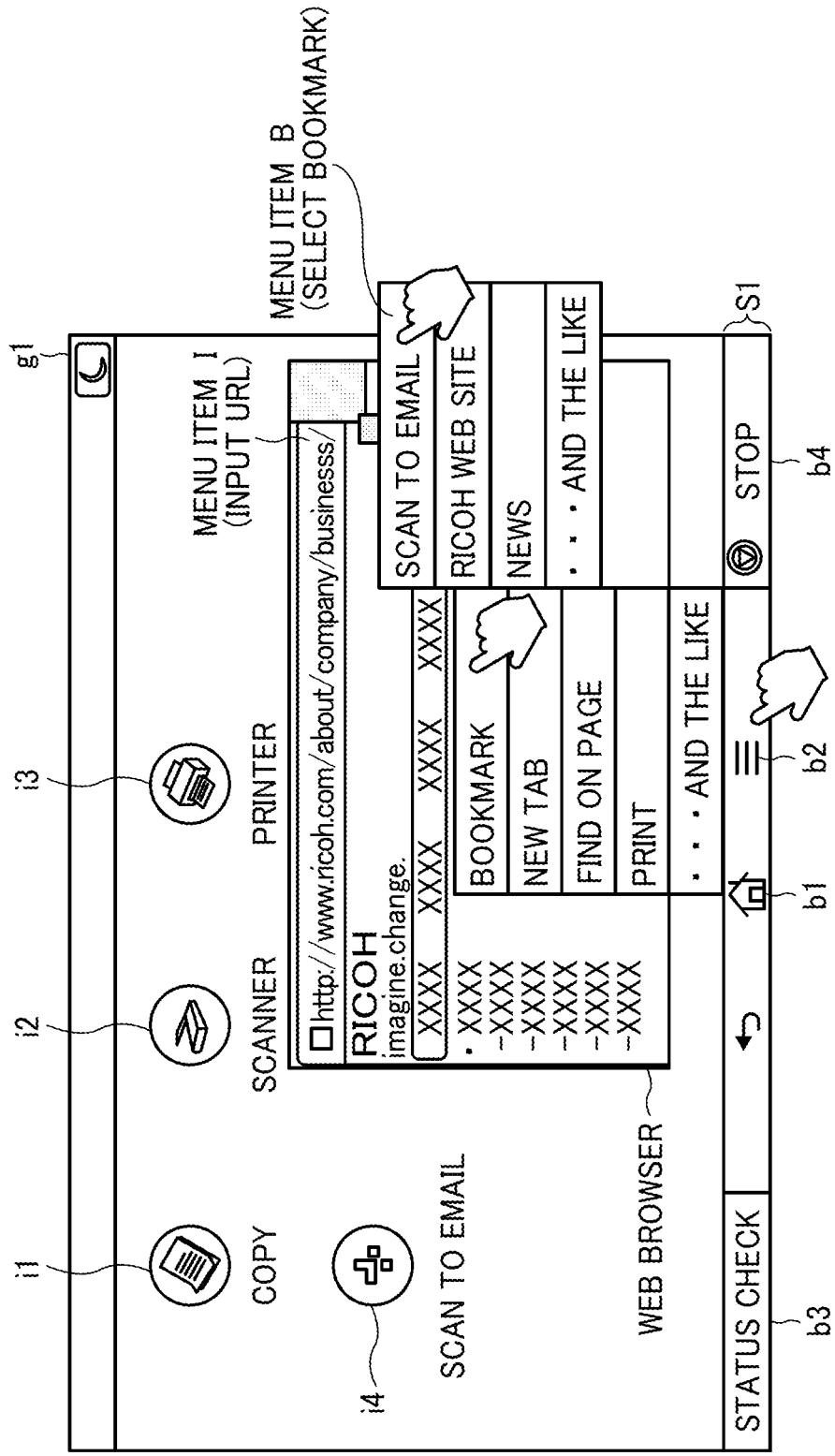
FIG. 7 is a diagram showing a display example of a common (home) screen.

FIG. 7 is a diagram showing a display example of the home screen. In the FIG. 7, the icons i1 to i4 are arranged as objects to be selected on the home screen g1. The icon i1 corresponds to the copy application 21a. The icon i2 corresponds to the scanner application 21b. The icon i3 corresponds to the printing application 21c. The applications corresponding to the icons i1 to i3 are called native applications, compared to Web application. The icon i4 corresponds to a Web application (Scan To Email). In FIG. 7, there is illustrated only one Web application, but icons of various Web applications may be arranged.

In FIG. 7, a status bar S1 is shown. The status bar S1 is an area that display buttons, and that is continuously displayed even when the display target screen (the screen being displayed) transitions to another screen. The status bar S1 includes a home button b1, a menu button b2, an apparatus status check button b3 to confirm the apparatus state, a stop button b4 to stop the apparatus process including job execution or information display, and the like. The home button b1 is a button to accept an instruction to display the home screen g1. In other words, when the home button b1 is pressed, the home screen display unit 22 executes steps S101 and S102. The menu button b2 is a button displayed on the status bar S1 by the browser unit 23. If the menu button b2 is pressed while the browser unit 23 is running and displayed, a menu item, provided by the browser unit 23, is displayed to accept various operation instructions to be transmitted to the browser unit 23. The menu item includes a menu item (hereinafter said as "menu item B") to accept an instruction to display one or more bookmark, and a menu item (hereinafter said as "menu item I") to accept an instruction to display an input area of the URL, etc. When the menu item B is selected, the browser unit 23 displays bookmarks (a list of URLs) based on the bookmark information stored in the bookmark storage unit 223. When the menu item I is selected, the browser unit 23 displays the input area of the URL.

Subsequently, the home screen display unit 22 waits for user selection of one of the icons displayed on the home screen g1 (S103). When any one of the icons is selected (Yes at S103), the home screen display unit 22 initiates the application or the Web application corresponding to the icon based on the icon information correspond to the icon selected by user (S104). When the initiation target icon is a Web application icon, in other words, when the command of the icon information is a character string indicating a initiation instruction of the Web application, the home screen display unit 22 sends an initiation instruction to the browser unit 23 via the API of the browser unit 23. The initiation instruction includes a URL and an initiation type (information indicating initiation reason) and the like, as a parameter in the icon information.

Figure 8:
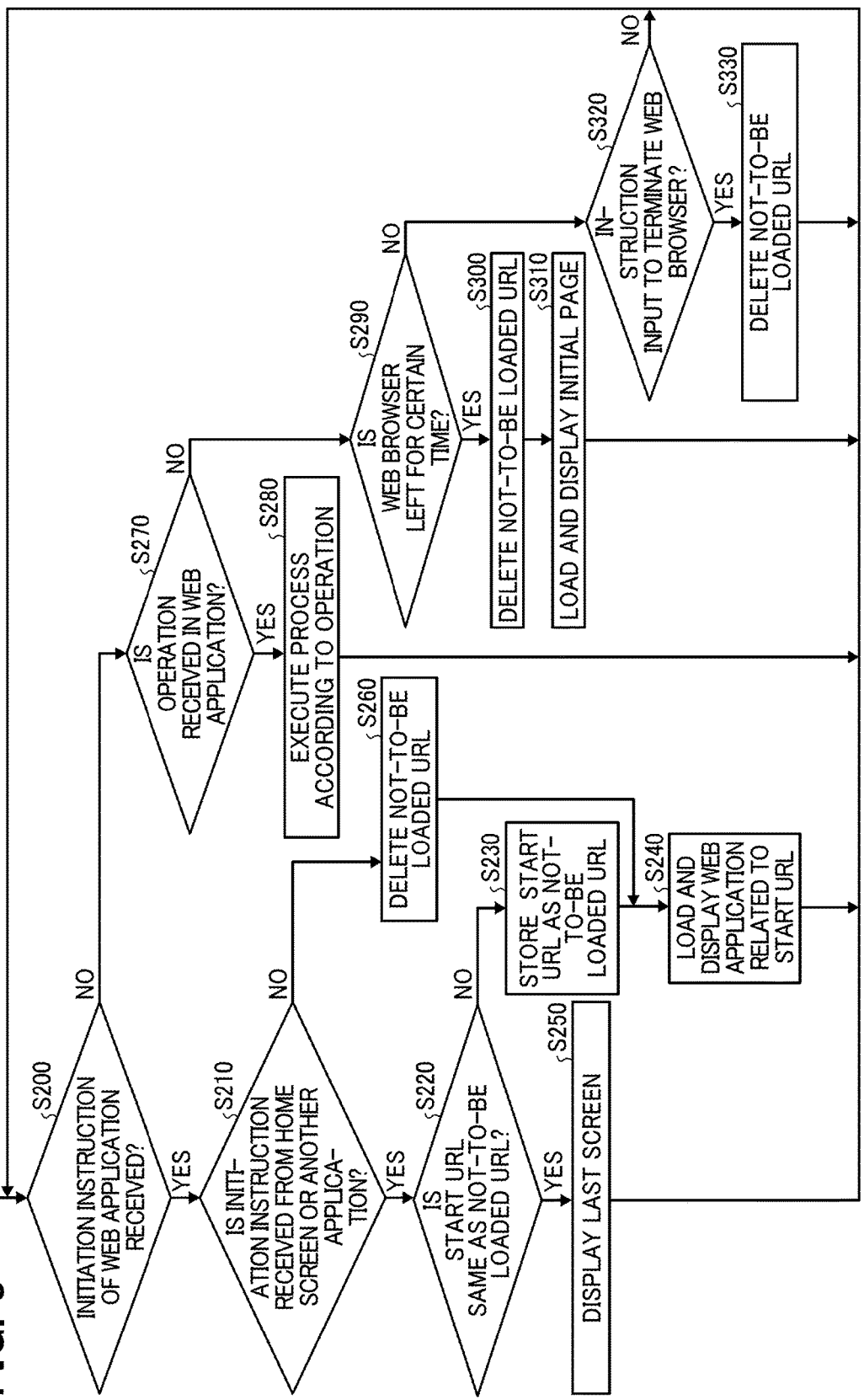
FIG. 8 is a flowchart showing a processing procedure executed by the browser unit in the first embodiment.

Next, a processing procedure executed by the browser unit 23 will be described. FIG. 8 is a flowchart for explaining an example of a processing procedure executed by the browser unit 23 in the first embodiment.

After being, initiated as a thread, the browser unit 23 waits for the occurrence of some event. For example, when an initiation instruction of the Web application occurs (Yes at S200), the initiation type determination unit 231 of the browser unit 23 judges whether the initiation instruction is based on the selection of the shortcut icon on the home screen g1, or based on an initiation request from another application (S210). When the Web application icon is selected on the home screen, as described in step S104 of FIG. 6, the URL of the Web application and the initiation type are included in the initiation instruction. Thus, if the initiation type is "shortcut", the initiation type determination unit 231 can determine that the initiation instruction is based on the selection of the shortcut icon. In addition, the initiation request from another application includes the command and the same URL as when the shortcut icon is selected, and "other application" is the initiation type. Therefore, if the initiation type is "another application", the initiation type determination unit 231 can determine that the activation instruction is based on an initiation request from another application.

An initiation instruction of the Web application also occurs by the selection of a bookmark or the input of an URL directly to input area. The bookmark and the input area is displayed by the browser unit 23. The browser unit 23 is able to detect the selection of the bookmark or the input of URL as an internal event of the browser unit 23. The initiation type determine unit 231 is able to determine the initiation type of the selection of the bookmark or the input of the URL are not based on the selection of shortcuts or the initiation instruction from another application.

In case the initiation instruction is based on the selection of the shortcut icon on the home screen g1, or based on the initiation request from another application (Yes at S210), the load necessity determining unit 232 determines whether or not the URL of the Web application instructed to initiate by the user coincides with the not-to-be loaded URL (S220). In the following, the URL of the Web application will be called "start URL". The not-to-be loaded URL is a URL stored in the not-to-be loaded URL storage unit 222. In case the process in FIG. 8 is executed for the first time after the information processing terminal 20 is started up (a power switch ON), nothing is stored in the not-to-be loaded URL storage unit 222. Therefore, in this case, the load necessity determining unit 232 determines the start URL does not match the not-to-be loaded URL.

In case the start URL does not match the not-to-be loaded URL (No at S220), the load necessity determination unit 232 stores the start URL in the not-to-be loaded URL storage unit 222 as, a not-to-be loaded URL (S230). Subsequently, the loading unit 233 loads (acquires) the Web application related to the start URL from the Web application server 30 and displays the top screen of the Web application on the display device 211 based on the definition of the Web application (S240).

On the other hand, in case the start URL matches the not-to-be loaded URL, in other words, when the start URL is the URL of the web application loaded the last time (Yes at S220), the browser unit 23 displays the screen that was displayed the last time on the device 211 (S250). Specifically, the browser unit 23 displays a front layer on the display device 211. In other words the order of layers is changed as the browser unit comes to the upper layer that the user can view. As a result, the screen which was displayed in the browser unit 23 the last time is displayed again.

In case that the initiation type instructed by the user to initiate the Web application is not based on the selection of the shortcut icon on the home screen g1 or the initiation request from another application, but is based on a bookmark selected or the URL is directly input (No at S210), the load necessity determination unit 232 deletes the stored content (the not-to-be loaded URL) in the not-to-be loaded URL storage unit 222 (S260) and then executes step S240. In other words, when a Web application is initiated by selecting a bookmark or directly inputting a URL, the URL of the Web application is not stored in the not-to-be loaded URL storage unit 222, and the Web application is loaded from the beginning.

On the other hand, instead of instructing initiation to the Web application (No at S200), if the screen of the Web application is operated by user in the state that the screen of Web application is displayed by the browser unit 23 (Yes at S270), the browser unit 23 executes a process according to the operation (S280). For example, if a link in the screen displayed by the browser unit 23 is selected, the loading unit 233 loads the content including the destination screen transitioned from previous screen based on the URL related to the link and the destination screen is displayed on the display device 211 by browser unit 23. Even if the transition of the screen occurs within the Web application, the not-to-be loaded URL storage unit 222 is not updated.

In a case in which the browser unit 23 is left undisturbed for a certain time, for example at least one minutes, (Yes in S290), the load necessity determination unit 232 deletes (clears) the not-to-be loaded URL stored in the not-to-be loaded URL storage unit 222 (S300). Subsequently, the loading unit 233 loads and displays a predetermined initial top page (S310). The state that the browser unit 23 is left undisturbed for a certain time means a state that the screen displayed by the browser unit 23 receives no operation has continued for a certain time. The certain time includes the period while the browser unit 23 is displayed as the front layer on the surface of the display device 211, and while the browser unit 23 is not displayed as the back layer of another native application. Further, the initial page (screen) may be, for example, a description screen of the browser unit 23 or a description screen of the web application.

The transition to the initial page is performed in order to prevent the screen of a certain web application from being kept displayed for a long time. Executing the transition to the initial page (screen), has the following effects. For example, it is assumed that a certain user A transitioned the screen of the Web application a to a screen including confidential information such as personal information (for example user ID and password, or user usage log, or user setting) having high confidentiality, and the user A finished and leaves the image forming apparatus 10 in the state the confidential information screen being displayed. In this case, even if the user A ended to use the image forming apparatus 10 after pressing the home button b1 to display the home screen g1, if the other user B selects the icon of the same web application a, Step S250 is executed and the screen included in the confidential information is displayed. To avoid such a situation, the transition to the initial screen is executed automatically. Also, so that the not-to-be loaded URL stored in the not-to-be loaded URL storage unit 222 is deleted (cleared) after the browser unit 23 is left for a certain time, the problem to display the confidential information is also prevented. Since the not-to-be loaded URL stored in the not-to-be loaded URL storage unit 222 is deleted, even if the user B selects the icon of the Web application a, step S240 is executed, and the top screen of the Web application a is displayed again.

Also, when an instruction to terminate (or close) the browser unit 23 is input by the user (S320), the load necessity determination unit 232 deletes (clears) the not-to-be loaded URL stored in the not-to-be loaded URL storage unit 222 (S330). Subsequently, the thread of the browser unit 23 may end after step S330. The instruction to terminate the browser unit 23 is, for example, input via a menu item displayed by pressing the menu button b2 on the status bar S1 or termination of information processing terminal 20. By deleting the not-to-be loaded URL stored in the not-to-be loaded URL storage unit 222 at the time of termination of the thread in the browser unit 23, it is possible to avoid displaying the screen of the Web application targeted to be initiated first after the browser unit 23 is started up as a thread, in the state that the screen of the Web application is displayed before the termination of the browser unit 23.

By executing the process procedure shown in FIG. 8, for example, the user standing in front of the image forming apparatus 10 can experience the following.

(1) When the user turns on the power of the image forming apparatus 10, the home screen g1 shown in FIG. 7 is displayed on the display device 211 (FIG. 6: S101, S102).

(2) Subsequently when the user selects (taps) the icon i4, steps S230 and S240 of FIG. 8 are executed and the top screen of the Web application is displayed on the display device 211. The Web application is related to the URL ("http://WebApplication_top.com") included in the icon information corresponding to the icon i4, and the URL ("http://WebApplication_top.com") is stored in the not-to-be loaded URL storage unit 222 as a not-to-be loaded URL.

Figure 9:
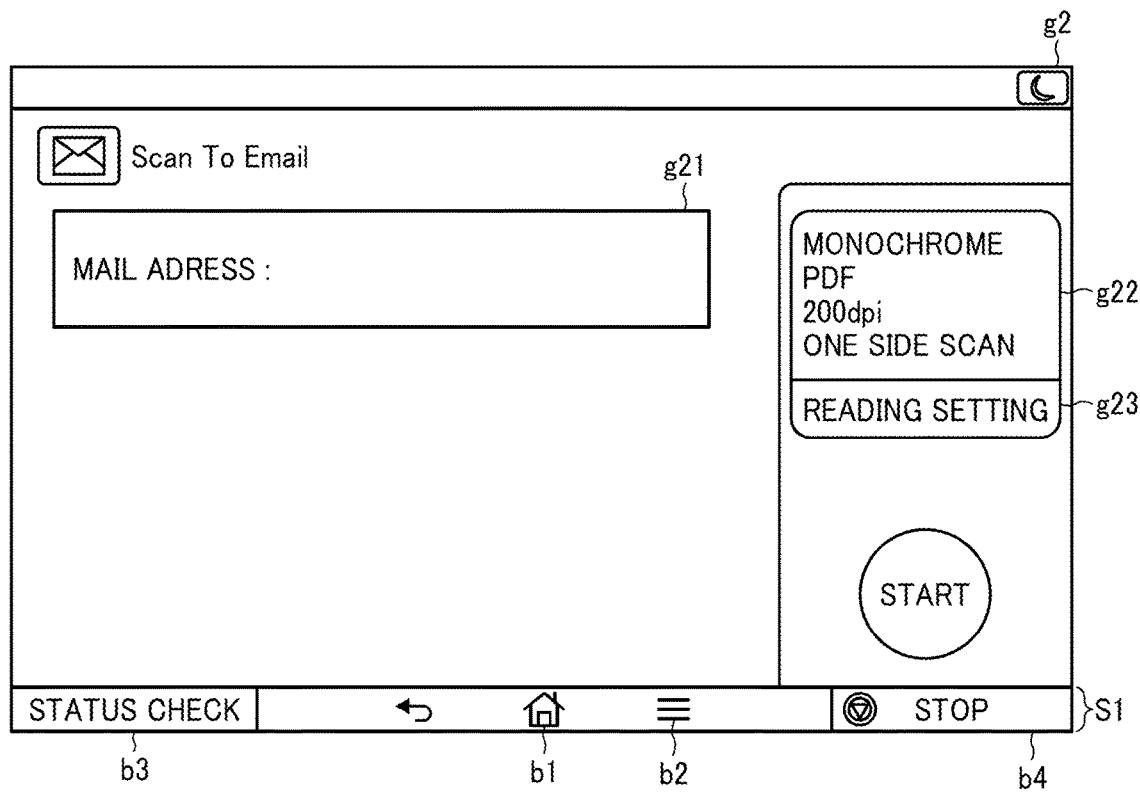
FIG. 9 is a diagram showing a top screen of a Web application.

FIG. 9 is a diagram showing an example of the top screen of the Web application. In FIG. 9, a description of the same parts as FIG. 7 is omitted. FIG. 9 shows an example of a top screen g2 of a Web application Scan to Email. The Web application causes the image forming apparatus 10 to scan image data from a document and transmit the image data by e-mail. The first screen g2 includes a mail address input area g21, a reading setting display area g22, a link g23, and the like.

The mail address input area g21 is an area to receive input of the mail address for sending the image data. The reading setting display area g22 is an area to display current reading setting information concerning the reading of image data. Setting information include color setting (monochrome), file format (PDF), resolution (200 dpi), reading surface (one side), and the like. The link g23 is a link to a screen (hereinafter referred to as a "reading setting screen") to receive input of reading or scanning settings. Returning to the explanation of the operation experience.

(3) When the user selects (taps) the link g23 in the top screen g2, step S280 in FIG. 8 is executed and the content related to the URL ("http://WebApplication_second.com") corresponding to the link g23 is loaded and displayed on the browser unit 23. As a result, the reading setting screen is displayed on the display device 211.

Figure 10:
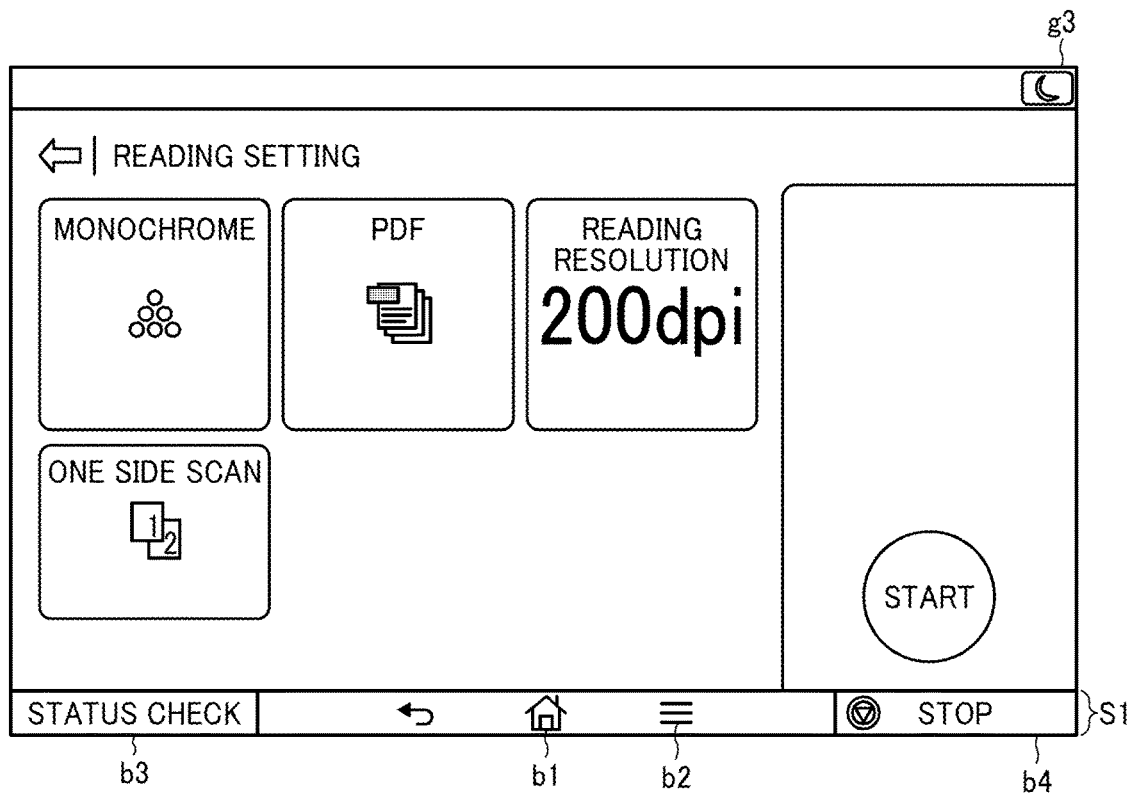
FIG. 10 is a diagram showing an example of a reading setting screen.

FIG. 10 is a diagram showing a display example of the reading setting screen. In FIG. 10, a description of the same parts as FIG. 7 or 9 is omitted. In FIG. 10, the reading setting screen g3 includes buttons to receive input settings of respective items related to reading setting.

(4) When the user presses the home button b1 while the reading setting screen, g3 is displayed, the home screen g1 is displayed on the display device 211 again. At this time, the browser unit 23 becomes a non-display state (be hidden) with the reading setting screen g3 being displayed on.

(5) Subsequently, when the user selects, for example, the icon i1, the screen of the copy application 21a is displayed on the display device.

(6) The user operates the screen of the copy application 21a and causes the image forming apparatus 10 to execute copying the document.

(7) When the user presses the home button b1 after the copying is finished, the home screen g1 is displayed on the display device 211 again. At this time, the screen of the copy application 21a is in a state not displayed (be hidden).

(8) Subsequently, when the user selects (taps) the icon i4, in step S220 of FIG. 8, the start URL ("http://WebApplication_top.com") corresponding to the icon i4 is compared with the not-to-be loaded URL ("http://WebApplication_top.com") stored in the not-to-be loaded URL storage section 222. In this case, since the two URLs match, step S250 is executed.

As a result, the reading setting screen g3 ("http://WebApplication_second.com") displayed last on the browser unit 23 as the Web application corresponding to the icon i4 is displayed.

In the above, it is described that the same processing is executed when the initiation type indicate an initiation request from another application, and when the initiation instruction based on the selection of the shortcut icon. But in step S210 of FIG. 8, it may be determined only whether the initiation instruction is based on the selection of the shortcut icon on the home screen g1. In this case, if an initiation instruction is based on an initiation request from another application, steps S230 and S240 may be executed regardless of whether or not the start URL matches the not-to-be loaded URL. Or step S240 may be executed subsequent to S260.

As described above, according to the first embodiment, even when an icon of the Web application is selected after transitioning and operating the home screen g1 or the screen of another application (like the native application), the web application (the browser unit 23) is displayed in the state the screen used by the user last time is displayed. Therefore, it is possible to enhance commonality of user's operational feeling of each screen displayed on a plurality of applications including the web application and the native application from the home screen g1 as a common screen.

Next, a second embodiment is described. In the second embodiment, the points different from the first embodiment are described. Therefore, points not mentioned specifically may be the same as the first embodiment.

Figure 11:
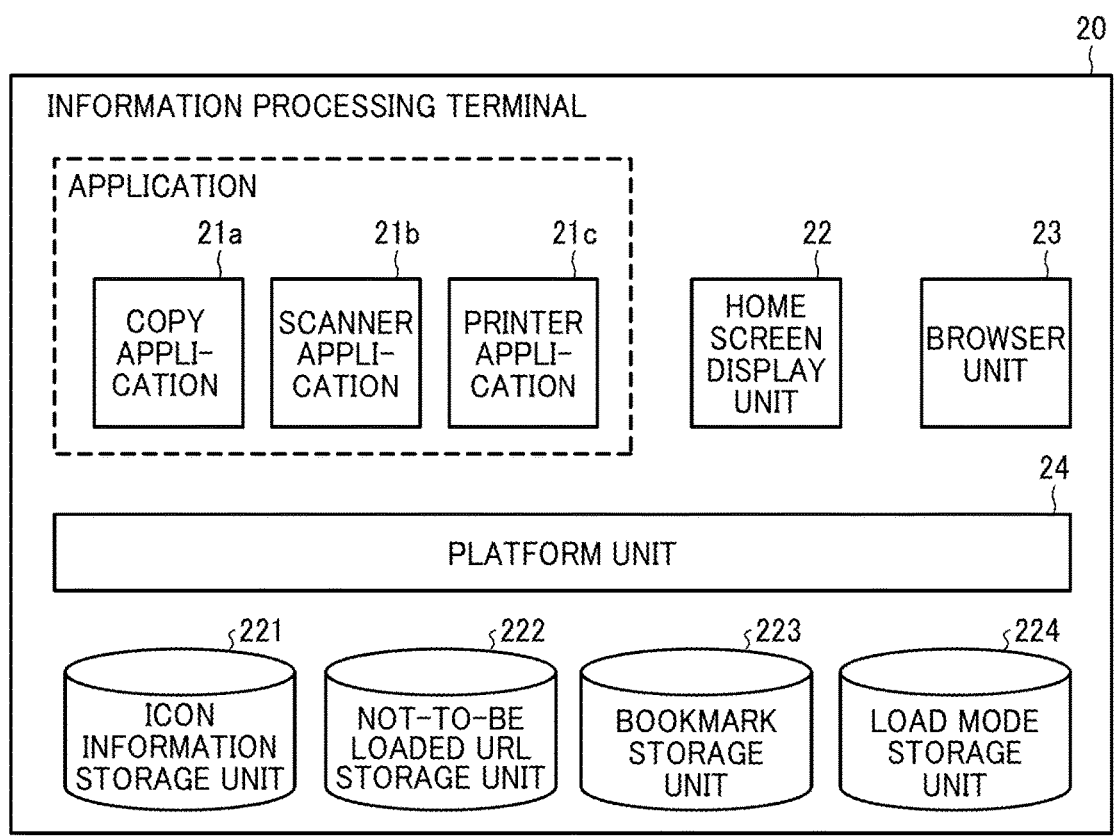
FIG. 11 is a diagram showing a functional (software) configuration of an information processing terminal according to a second embodiment.

FIG. 11 is a diagram showing a functional (software) configuration example of the information processing terminal 20 in the second embodiment. In FIG. 11, a description of the same parts description of FIG. 4 is omitted. In FIG. 11, the information processing terminal 20 further includes the load mode storage unit 224. The load mode storage unit 224 can be implemented in the same method as the other storage units.

The load mode is stored in the load mode storage unit 224. The load mode is a setting related to the loading of the web application. Specifically, the value of the load mode is "load" or "no-load". "Load" means that the web application is always loaded regardless of whether or not the URL of the web application to be initiated matches the not-to-be loaded URL. The term "no-load" means that in case the URL of the Web application to be initiated matches the not-to-be loaded URL, the Web application is not loaded. Therefore, the behavior in the case of "no-load" is the same as in the first embodiment. In this second embodiment, it is assumed that the default value of the load mode is "load". This is to prevent a screen containing confidential information from being left displayed. However, the default value of the load mode can be decided according to the situation of user and may be "no-load".

An instruction to set the load mode to the load mode storage unit 224 is defined by an extended (extension) script in each Web application. The extended script has, for example, the following interface specifications.

setLoadMode (mode)

The argument of the mode is the above value of load mode. In the second embodiment, each web application can be defined to call setLoadMode (mode) at an arbitrary (optional) timing. In other words, in the second embodiment, whether to use or not to use the not-to-be loaded URL can be set for each Web application.

Figure 12:
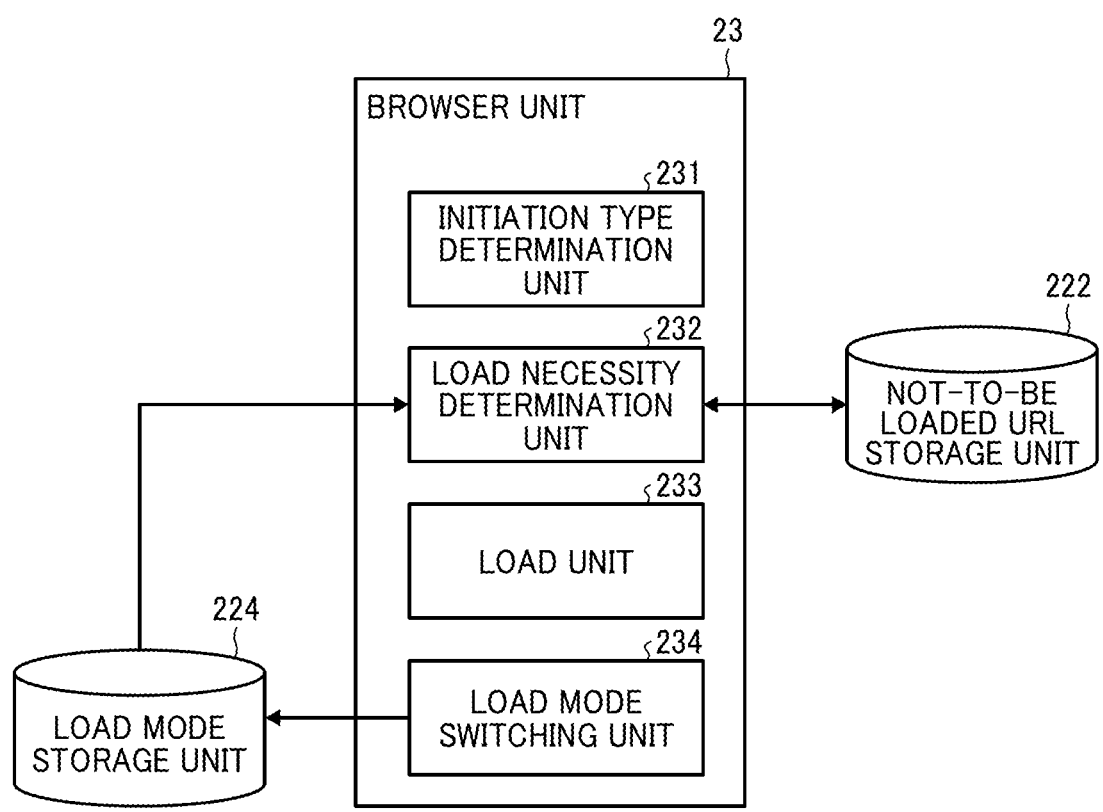
FIG. 12 is a diagram showing a functional (software) configuration of a browser unit in the second embodiment.

FIG. 12 is a diagram showing a functional configuration example of the browser unit 23 in the second embodiment. In FIG. 12, a description of the same parts as FIG. 5 is omitted. In FIG. 12, the browser unit 23 further includes a load mode switching unit 234. The load mode switching unit 234 switches (changes) the load mode stored in the load mode storage unit 224 according to the call of setLoadMode (mode) by the Web application. The load mode switching unit 234 also initializes the load mode stored in the load mode storage unit 224 to a default value (load) at a predetermined timing.

Figures 13, 13A:
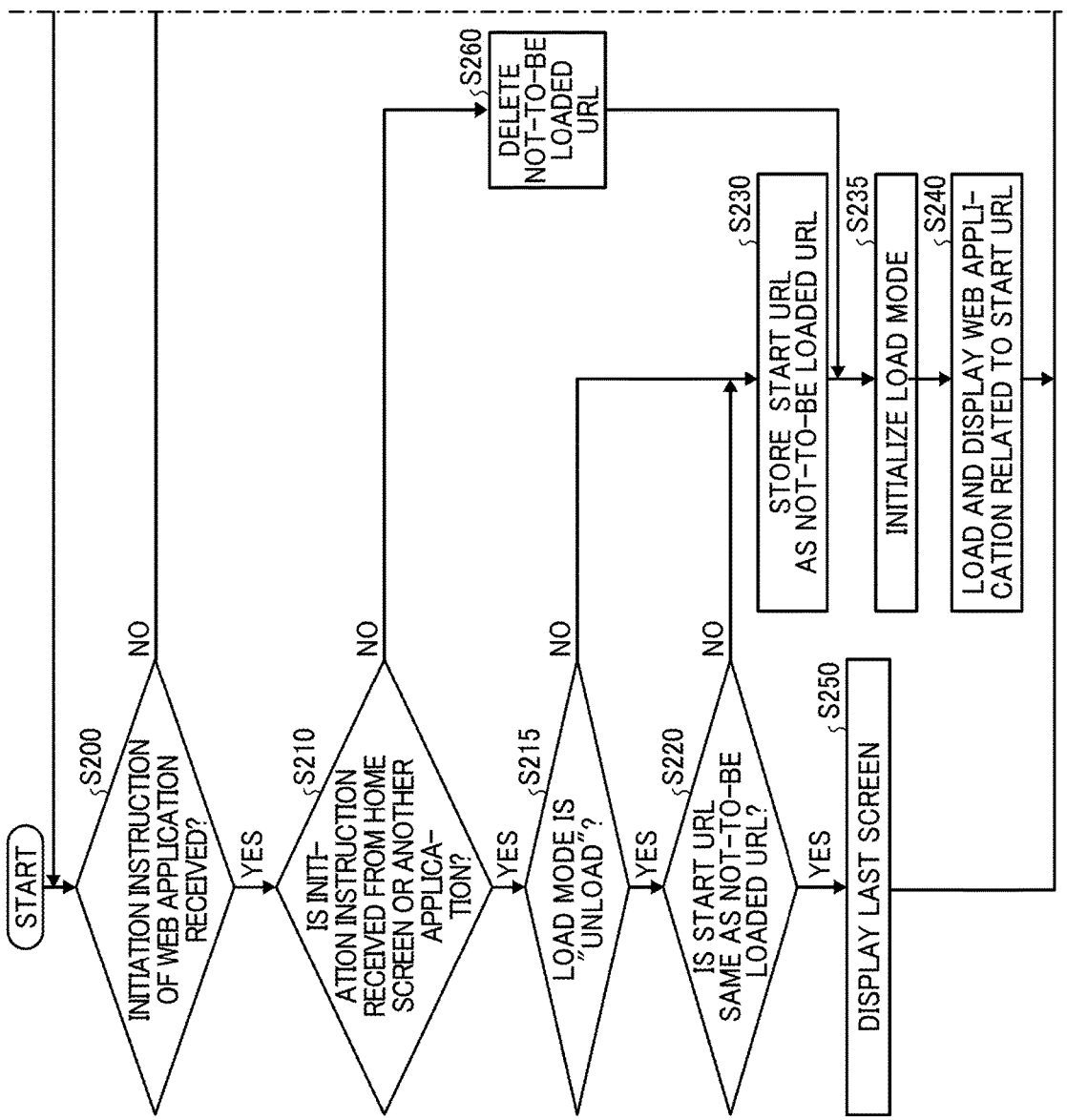
FIGS. 13A and 13B are a flowchart for explaining a processing procedure executed by the browser unit in the second embodiment.
Figure 13B:
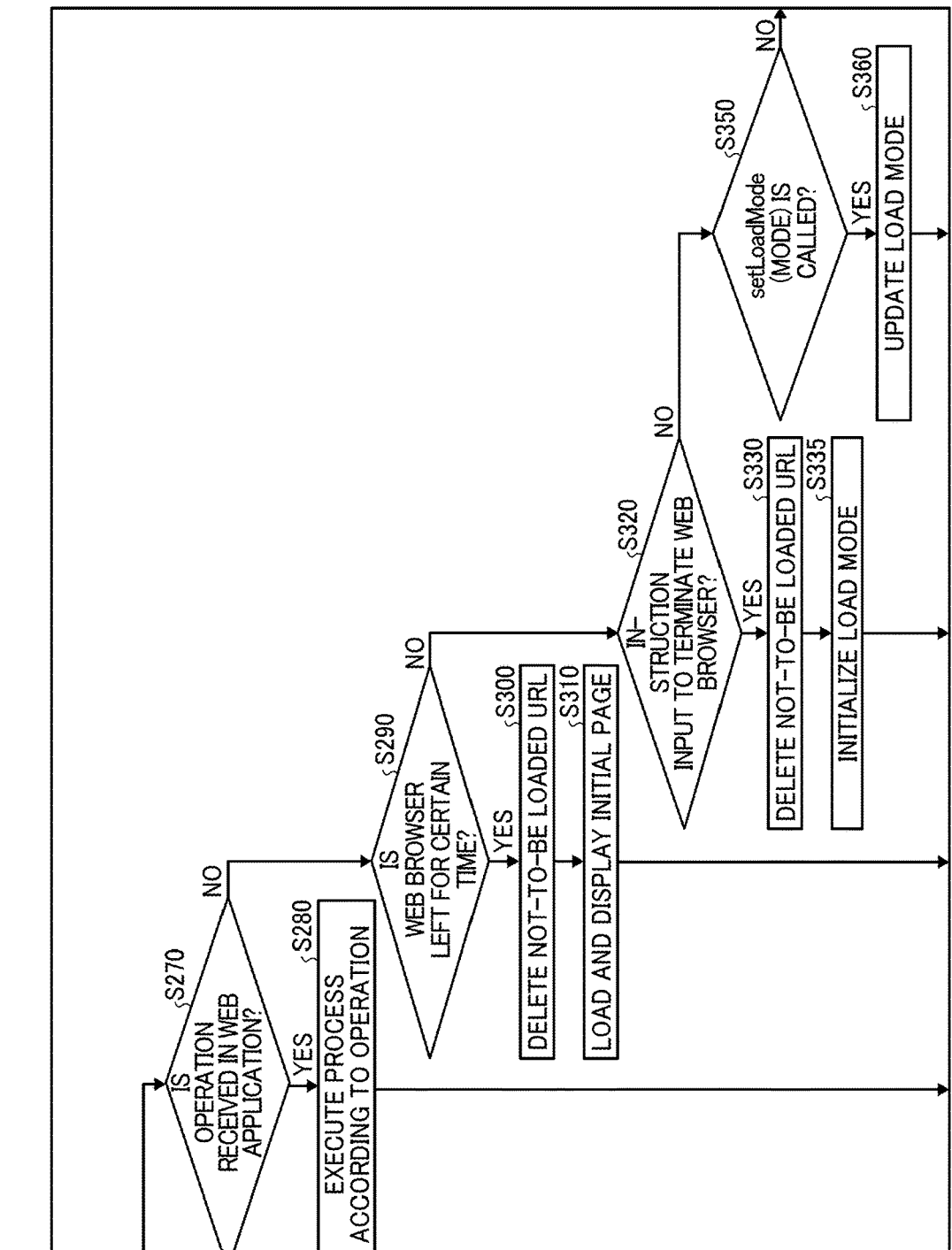

FIGS. 13A and 13B are a flowchart for explaining, a processing procedure executed by the browser unit 23 in the second embodiment. In FIGS. 13A and 13B, a description of the same steps as FIG. 8 is omitted.

In FIG. 13B, steps S350 and S360 are added. That is, when setLoadMode (mode) is called by the Web application being displayed (Yes at S350), the load mode switching unit 234 updates the load mode stored in the load mode storage unit 224 according to the value of mode (S360). The call to setLoadMode (mode) is performed, for example, when the Web application is loaded in step S240, when the Web application is displayed in step S250, or when an operation on the screen of the Web application is input in step S280. The timing that setLoadMode (mode) is called depends on the implementation of the Web application. For example, if the Web application is (want to be) implemented to switch the load mode according to the screen transition, the Web application calls setLoadMode (mode) when a screen transition occurs at the timing of step S280. Thereby, it is possible to switch the load mode to "load" only when the screen is transitioned to the screen displaying confidential information, and to switch to the load mode to "unload" when the other screen that is not displaying confidential information.

In FIG. 13A, following step S210, step S215 is executed. In step S215, the load necessity determining unit 232 determines whether the load mode stored in the load mode storage unit 224 is "unload" or not. If the load mode is "unload" (Yes at S215), the process step S220 and after that are executed. That is, if the icon of the Web application that is same as the Web application loaded by user last time, is selected, the screen that has been displayed in the Web application the last time is displayed (S250).

On the other hand, if the load mode is not "unload" (No at S215), the process step S230 and after that is executed. In other words, when the load mode is "load", loading of the web application is always executed according to the selection of the icon.

Further, in FIG. 13A, step S235 is executed subsequent to step S230, and step S335 is executed subsequent to step S330. In steps S235 and S335, the load mode switching unit 234 initializes the load mode stored in the load mode storage unit 224 to "load" that is the default value. So that, the load mode is initialized when the Web application to be initiated is switched (S210-S235) or when the thread of the browser unit 23 ends (S320-S335).

By executing the process procedure shown in FIGS. 13A and 13B, the user standing in front of the image forming apparatus 10 can have the following experience.
(1) When the user A selects (taps) the icon i4, the Web application is loaded (S 240).
(2) When the web application calls setLoadMode ("unload") according to the load (Yes at S350), "unload" is stored in the load mode storage unit 224 (S360).
(3) After that, when the screen of the Web application transitions to the screen containing confidential information in response to the operation of the user A (S280), the Web application calls setLoadMode ("load") (Yes at S350). As a result, "load" is stored in the load mode storage unit 224 (S360). At the time of transition of the screen, for example, input of authentication information is requested to the user A. By inputting the authentication information of the user A, a screen including confidential information permitted to be accessed only by the user A is displayed.
(4) In this state, the user A displays the home screen g1 and ends the operation.
(5) After that, if the user B selects the icon i4 of the Web application displayed on the home screen g1, since the load mode is "load" (No at S215), the Web application is loaded again. And the top screen of the Web application is displayed (S240). As a result, re-display of highly confidential screens, accessible only by the user A, can be avoided.

As described above, according to the second embodiment, it is possible to switch the load mode at an arbitrary timing for each Web application. Therefore, for example, leakage of confidential information can be prevented.

In each of the above embodiments, the information processing terminal 20 is implemented as the operation unit of the image forming apparatus 10. However, it is also possible for the invention to be applied to an information processing terminal implemented as the operation unit of a projector, an electronic blackboard, a video conference system and the like. In that case, the hardware configuration of FIG. 2 is slightly changed depending on each devices (for example, the scanner 12, the printer 13 and the like of the image forming apparatus 10 are unnecessary). But each device may have a specific configuration. For example, the configurations may include a projector including a projection lens, an electronic blackboard including an electronic board, etc. in addition to or in place of components corresponding to the configuration including the information processing terminal 20, the controller 11, the network interface 16. Each of the described embodiments above may be applied to an information processing apparatus that can perform processes independently, such as a personal computer or the like, instead of the operation section of the device.

In each of the above embodiments, the information processing terminal 20 is an example of an information processing apparatus. The display device 211 is an example of a display unit or an operation panel. The loading unit 233 is an example of an acquiring (receiving) unit and a display control unit. The Web application is an example of screen data. The load necessity determination unit 232 is an example of a storage processing unit. The not-to-be loaded URL storage unit 222 is an example of a storage unit. The URL is an example of identification information of screen data. The home screen g1 is an example of the first screen. The top screen g2 is an example of the second screen. setLoadMode ("unload") is an example of a predefined definition of API that the web browser.

Each of the functions of the described embodiments may be implemented by one or more processing circuits or circuitry. Processing circuitry and circuitry includes a programmed processor, as a processor includes circuitry. A processing circuit and circuitry also includes devices such as an application specific integrated circuit (ASIC), digital signal processor (DSP), field programmable gate array (FPGA), and conventional circuit components arranged to perform the recited functions.

Although the embodiments of the present invention have been described in detail above, the present invention is not limited to such a specific embodiment and variations and modifications may be made without departing from the scope of the present invention.

What is claimed is:
1. An image forming apparatus, comprising:
an operation panel;
circuitry; and
a web browser executing on the circuitry,
wherein the circuitry performs:
  receiving an instruction to execute a web application;
  determining whether the web application was previously executed;
  displaying a previously generated screen of the web application, when the determining determines that the web application was previously executed; and
  displaying a new screen of the web application corresponding to a start screen, when the determining determines that the web application was not previously executed,
wherein the circuitry further performs ascertaining whether the receiving of the instruction to execute the web application originates from a first screen, wherein the displaying the previously generated screen is performed when the ascertaining ascertains that the instruction to execute the web application originates from the first screen, and the determining determines that the web application was previously executed, wherein the displaying the new screen is performed when the determining determines that the web application was not previously executed, or the ascertaining ascertains that the instruction to execute the web application does not originate from the first screen, wherein the image forming apparatus further includes
at least one of a printer to form an image and a scanner to generate an image, and
an application programming interface configured to instruct either the printer to form the image or the scanner to generate the image, wherein input to the web browser displayed on the operation panel causes the circuitry to execute calling of the application programming interface to control the printer or scanner.

2. The image processing apparatus according to claim 1, wherein the circuitry further performs:
storing identification information of the web application when the instruction to execute the web application has been received,
wherein when the identification information of the web application has been stored and corresponds to the identification of the web application, the determining determines the web application was previously executed.

3. The image processing apparatus according to claim 1, wherein the circuitry further performs:
determining whether a mode indicates to display the new screen,
wherein the displaying the previous screen is performed only if the mode does not indicate to display the new screen.

4. The image processing apparatus according to claim 1, wherein the circuitry further performs:
determining whether a mode indicates to display the new screen,
wherein the displaying the previous screen is performed only if the mode does not indicate to display the new screen.

5. An image processing method performed using an operation panel, circuitry, and a web browser executing on the circuitry, comprising:
receiving an instruction to execute a web application;
determining whether the web application was previously executed;
displaying a previously generated screen of the web application, when the determining determines that the web application was previously executed; and
displaying a new screen of the web application corresponding to a start screen, when the determining determines that the web application was not previously executed,
wherein the method further includes ascertaining whether the receiving of the instruction to execute the web application originates from a first screen,
wherein the displaying the previously generated screen is performed when the ascertaining ascertains that the instruction to execute the web application originates from the first screen, and the determining determines that the web application was previously executed, and
wherein the displaying the new screen is performed when the determining determines that the web application was not previously executed, or the ascertaining ascertains that the instruction to execute the web application does not originate from the first screen, the method further comprising calling an application programming interface to instruct a printer to form an image or a scanner to generate an image, wherein input to the web browser displayed on the operation panel causes the circuitry to execute calling of the application programming interface to control the printer or scanner.

6. The image processing method according to claim 5, further comprising:
storing identification information of the web application when the instruction to execute the web application has been received,
wherein when the identification information of the web application has been stored and corresponds to the identification of the web application, the determining determines the web application was previously executed.

7. The image processing method according to claim 5, further comprising:
determining whether a mode indicates to display the new screen,
wherein the displaying the previous screen is performed only if the mode does not indicate to display the new screen.

8. The image processing method according to claim 5, further comprising:
determining whether a mode indicates to display the new screen,
wherein the displaying the previous screen is performed only if the mode does not indicate to display the new screen.

9. An image forming apparatus, comprising:
an operation panel;
circuitry; and
a web browser executing on the circuitry,
wherein the circuitry performs:
receiving a first instruction to execute a web application;
displaying a top screen of the web application on the operation panel;
displaying second screen of the web application on the operation panel;
receiving a second instruction to execute again the web application;
determining whether the web application was previously executed;
displaying again the second screen of the web application, when the determining determines that the web application was previously executed; and
displaying again the top screen of the web application, when the determining determines that the web application was not previously executed,
wherein the image forming apparatus further includes
at least one of a printer to form an image and a scanner to generate an image, and
an application programming interface configured to instruct either the printer to form the image or the scanner to generate the image,
wherein input to the web browser displayed on the operation panel causes the circuitry to execute calling of the application programming interface to control the printer or scanner.

10. The image forming apparatus according to claim 9, wherein:

the displaying again of the second screen is not performed when the web browser is inactive for at least a predetermined period of time, when the determining determines that the web application was previously executed, and instead of displaying again the second screen, the displaying again the top screen is performed.

* * * * *